April 17, 1928. 1,666,146
W. P. REAVES
REFLECTING AND REFRACTING DEVICE FOR STEREOSCOPES
Filed Sept. 26, 1923 3 Sheets-Sheet 1
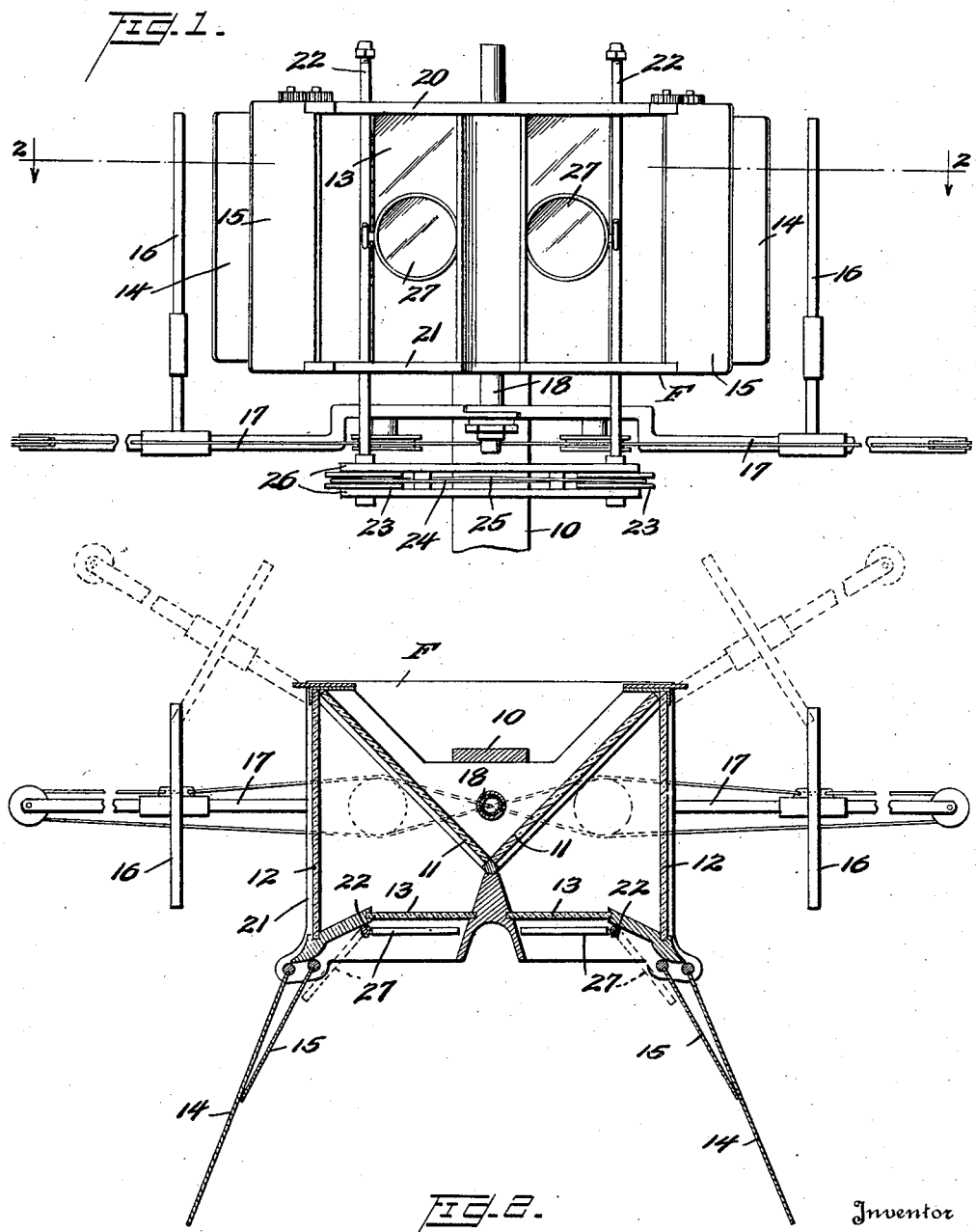

April 17, 1928.  W. P. REAVES  1,666,146
REFLECTING AND REFRACTING DEVICE FOR STEREOSCOPES
Filed Sept. 26, 1923   3 Sheets-Sheet 2
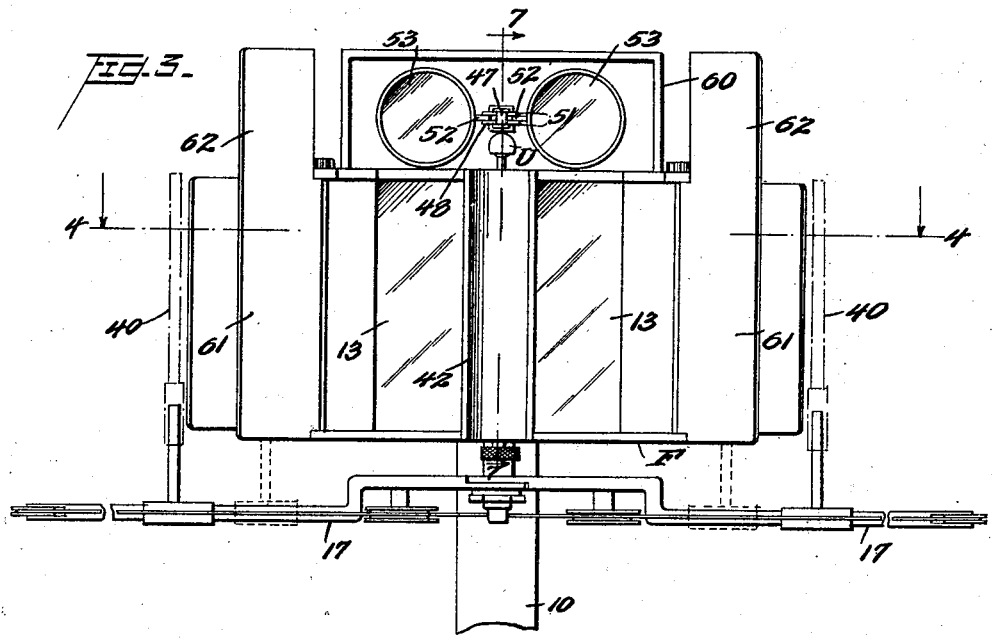
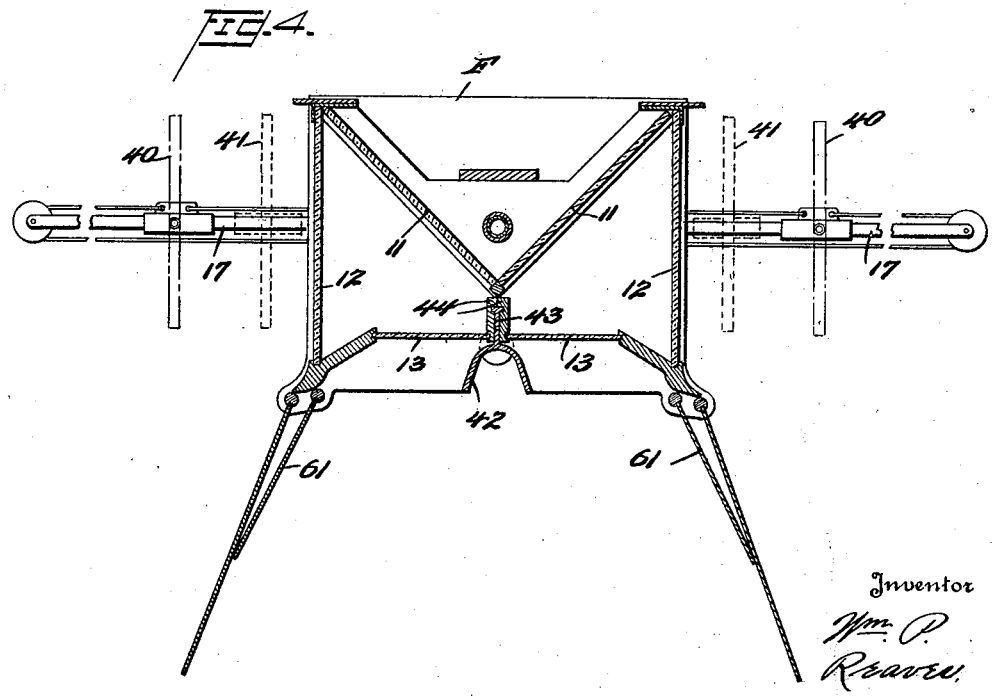

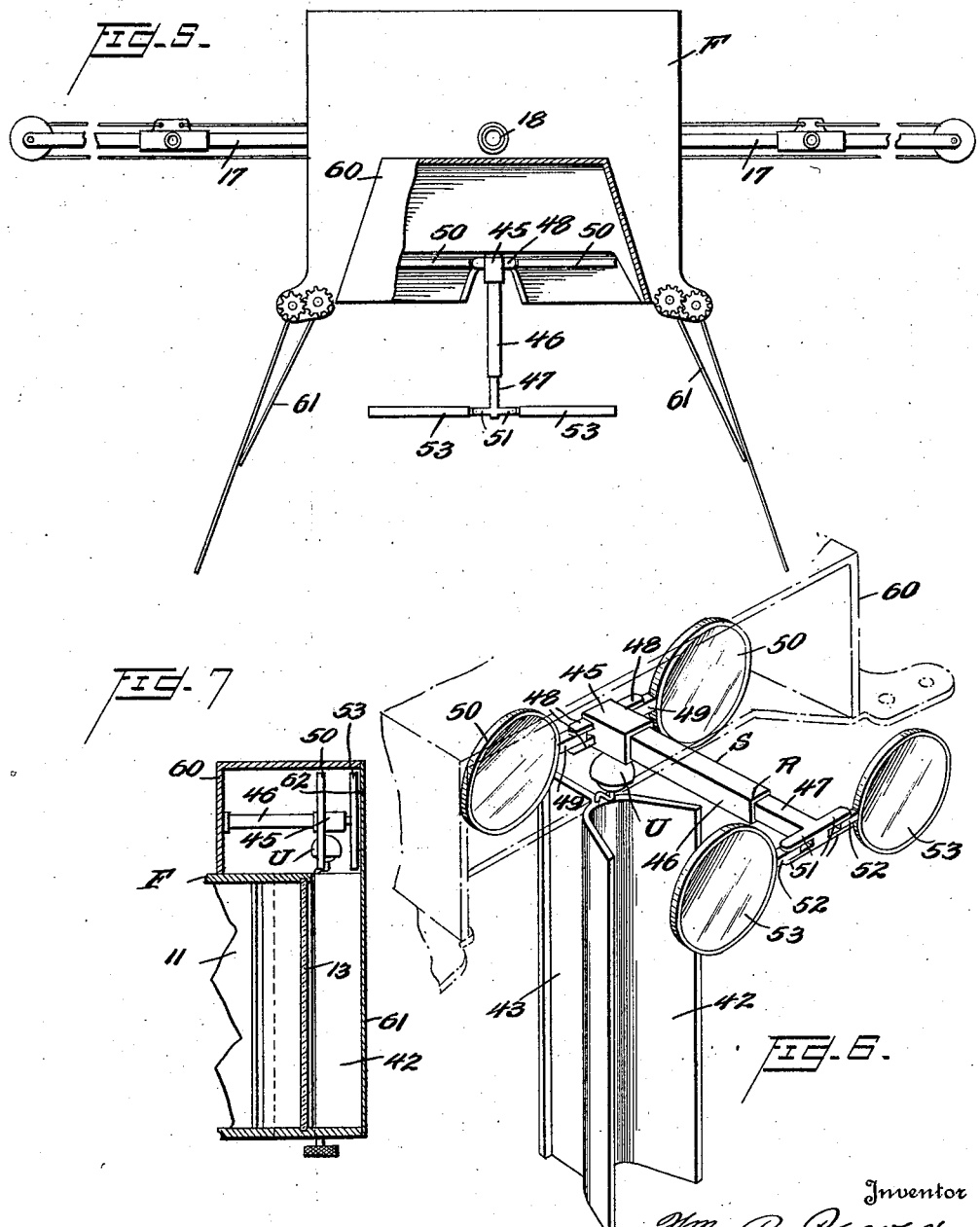

Patented Apr. 17, 1928.

1,666,146

UNITED STATES PATENT OFFICE.

WILLIAM P. REAVES, OF GREENSBORO, NORTH CAROLINA.

REFLECTING AND REFRACTING DEVICE FOR STEREOSCOPES.

Application filed September 26, 1923. Serial No. 664,954.

In my copending application, Serial No. 659,983, filed August 29, 1923, is disclosed and claimed a reflecting and refracting device adapted to be used in binocular observation of plates or objects in radiographic diagnosis. The present invention relates to the same class of optical devices and has for its object the provision of improved means whereby the radiographic diagnostician may more accurately than heretofore observe and study radiographic plates mounted on a stereoscope. The invention consists essentially in the adjustable attachment to the observation device of a stereoscope, commonly known as a mirror box or frame, of a plurality of lenses so that the diagnostician may combine them in various ways and is thereby enabled to more distinctly and accurately focus the radiographic plates so that they appear at the proper distance, and so that they are magnified as desired.

Two forms of the invention are disclosed by way of example but it will be understood that the invention may be embodied in various other forms as may be found convenient or desirable, without departing from its spirit or scope. In the drawings:

Figure 1 is a front elevation of one form of the reflecting and refracting device;

Figure 2 is a section on line 2—2 of Figure 1;

Figure 3 is a front elevation of a modified form of the invention;

Figure 4 is a section on line 4—4 of Figure 3;

Figure 5 is a top plan view of the form of the invention shown in Figures 3 and 4;

Figure 6 is a perspective view of the lenses employed; and

Figure 7 is a section on line 7—7 of Figure 3, the dust protecting doors being illustrated in closed position.

Referring particularly to Figures 1 and 2 it will be seen that the box-like frame F, which is suitably supported upon an upright member 10, includes two mirrors 11 arranged at an angle of 90° and their protecting glasses 12, 12, and 13, 13, respectively. The detailed construction of the frame is disclosed and described in my prior application and will not be set forth at length herein as it forms no part of my present invention. The dust protecting doors 14, 14 and 15, 15 are disclosed and claimed in my copending application Serial No. 605,213, filed December 6, 1922 and the mirrors and protecting glasses, and the manner of supporting the same, are disclosed in my copending application Serial No. 622,551, filed March 3, 1923.

Side lenses are indicated at 16, 16, these lenses being slidably supported upon arms 17, 17, which may be swung about a vertically adjustable post 18 to either operative position as shown in full lines in Figures 1 and 2, or into inoperative position as shown in dotted lines in Figure 2, and out of the observer's line of sight. The particular means for supporting the lenses 16, and the means for securing their adjustment simultaneously toward and from the mirrors as desired is fully described in my copending application Serial No. 659,983 above referred to.

Extending through vertically aligned apertures in the top and bottom plates 20 and 21 respectively of the frame are parallel rods 22. These rods are slidably mounted in members 20, 21. To the lower end of each is secured a pulley 23 and these pulleys are connected by a cord or belt 24 which extends around each pulley but which cord is crossed at its midpoint 25. Horizontal plate members 26 serve to keep the pulleys in fixed spaced relation. Simultaneous rotation of rods 22 in opposite directions may be effected by the rotation of either pulley 23 by the operator or observer.

Detachably secured to the rods 22 are lenses 27 and it will be seen that by rotation of the rods by means of the pulleys these lenses may be swung from operative position shown in full lines in Figure 2 to inoperative position, as indicated in dotted lines in this figure.

The lenses 27 may be used by themselves or in conjunction with the lenses 16 in securing a proper focus of the radiographs. Vertical adjustment of lenses 27 and horizontal adjustment of lenses 16 gives the apparatus great flexibility and permits the diagnostician to examine with care any portion of the radiographs.

In the form of the invention disclosed in Figures 3 to 6 inclusive it is optional with the diagnostician to use two or more side lenses 40—40 or 41—41 in combination with a plurality of lenses in front of the frame F. I have shown in Figure 4, four side lenses, two mounted on each side of the frame, and in such instance means is provided for simultaneously sliding the lenses of each pair toward or away from each other to obtain the proper focus.

In this form of the device I provide a nose piece 42 with a rearwardly extending central blade or fin 43 which is slidably held in a trackway formed partly in each of two vertically extending stationary frame members 44. To the upper end of the slidable nose piece (see Fig. 6) is attached a lens support S by means of some suitable form of universal coupling U. The lens support S comprises a sleeve member 45 rigidly secured to a portion of the universal coupling and this sleeve member slidably receives a telescoping rod R which comprises an outer member 46 and an inner member 47. The sleeve 45 has projecting laterally therefrom, pairs of lugs 48 having adjacent faces in parallel spaced relation. Tongues 49 of lenses 50 are adapted to be frictionally held between the pairs of lugs 48 the distance between the centers of the lenses being the interpupilary distance of the observer. The lenses being frictionally held in position may be quickly removed and replaced by other lenses of different focal lengths in the operation of the device.

The end of member 47 is likewise provided with pairs of lugs 51 having its adjacent faces parallel and these lugs frictionally hold tongues 52 of lenses 53, which lenses may be removed and replaced by other lenses, quickly and easily as in the case of lenses 50. By sliding the member 46 through the sleeve 45, and telescoping the inner member 47 within the member 46 the distance between the two sets of lenses may be adjusted as desired and by moving the nose piece vertically the lens support and the system of lenses may be brought to the desired horizontal position.

When it is not desired to use the set of lenses just described, it may be placed within a special lens receiving and protecting hood 60 secured to the top member of the frame F. The nose piece 42 is moved to its uppermost position and lenses 53 are moved rearwardly by telescoping members 46 and 47 and thrusting member 46 through the sleeve 45 in a rearward direction until the lenses occupy the positions in which they are shown in Figure 6. The front dust protecting doors 61 are provided with upwardly extending portions 62 which serve to close the front of the lens containing compartment and to protect the lenses when the device is not in use.

The use of a system of lenses or like refractory instruments with the mirrors enables the observer to make a more accurate observation and diagnosis than when such lenses are not employed, and the use of a plurality of lenses enables a number of combinations to be made, giving the instrument great flexibility. Owing to the manner in which the lenses are secured they may be easily detached and other lenses of different focal lengths substituted so that notwithstanding any defects in the sight of the diagnostician himself, the radiograph may soon be brought into perfect focus, and at any desired enlargement. If desired, a system of six or eight lenses may be used in front of the mirrors, and this system may be used with side lenses or without side lenses. Many combinations or arrangements of lenses may be used and the invention is not limited in this respect.

Having thus described the invention what is claimed as new and desired to be secured by Letters Patent is:

1. In an apparatus of the class described, in combination, a frame, mirrors mounted on the frame and arranged at an angle to each other, two lenses for each mirror, the axes of the lenses of each set intersecting at an angle of 90° and the lenses being adjustable into or out of operative position.

2. In an apparatus of the class described, in combination, a frame, mirrors mounted on the frame and arranged at an angle to each other, two lenses supported on the frame, one lens to cooperate with each mirror, said lenses being in the same plane when in operative position but being adapted to swing to inoperative position.

3. An apparatus of the class described, in combination, a frame, mirrors mounted on the frame and arranged at an angle to each other, and a plurality of lenses adapted to be brought into cooperative relationship to said mirrors, said lenses being adjustable vertically into and out of operative position.

4. In an apparatus of the class described, in combination, a frame, mirrors mounted on the frame and arranged at an angle to each other, a member secured to the frame for vertical sliding movement, and a set of lenses mounted on the vertical slidable frame.

5. In an apparatus of the class described, in combination, a frame, mirrors mounted on the frame and arranged at an angle to each other, a plurality of lenses, a lens support for said lenses, and a universal connection between said lens support and said frame, for the purpose set forth.

In testimony whereof I hereunto affix my signature.

WILLIAM P. REAVES.